US009198028B2

(12) United States Patent
Chen

(10) Patent No.: US 9,198,028 B2
(45) Date of Patent: Nov. 24, 2015

(54) COMMUNICATION SYSTEM, MOBILE COMMUNICATION APPARATUS AND SWITCHING METHOD OF SUBSCRIBER IDENTIFICATION INFORMATION

(71) Applicant: WISTRON CORP., New Taipei (TW)

(72) Inventor: Kuo-Yi Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 42 days.

(21) Appl. No.: 14/259,142

(22) Filed: Apr. 22, 2014

(65) Prior Publication Data

US 2015/0105064 A1  Apr. 16, 2015

(30) Foreign Application Priority Data

Oct. 16, 2013  (TW) .............................. 102137343 A

(51) Int. Cl.
*H04W 8/20* (2009.01)
(52) U.S. Cl.
CPC .................................... *H04W 8/205* (2013.01)
(58) Field of Classification Search
CPC ..... H04W 8/205; H04W 12/08; H04W 8/183; H04W 8/245; H04W 8/265
See application file for complete search history.

(56) References Cited

U.S. PATENT DOCUMENTS

| | | | | |
|---|---|---|---|---|
| 5,943,620 A | * | 8/1999 | Boltz et al. | 455/445 |
| 7,363,056 B2 | * | 4/2008 | Faisy | 455/558 |
| 9,049,596 B1 | * | 6/2015 | Kronrod | |
| 2004/0176092 A1 | * | 9/2004 | Heutschi | 455/435.1 |
| 2005/0063544 A1 | * | 3/2005 | Uusitalo et al. | 380/277 |
| 2010/0222104 A1 | * | 9/2010 | Lee | 455/558 |
| 2012/0077496 A1 | * | 3/2012 | Mathias et al. | 455/435.1 |
| 2013/0029700 A1 | | 1/2013 | Noldus et al. | |
| 2013/0165073 A1 | * | 6/2013 | Madsen | 455/411 |
| 2013/0303203 A1 | * | 11/2013 | Wang et al. | 455/458 |

FOREIGN PATENT DOCUMENTS

| | | |
|---|---|---|
| CN | 102469443 A | 5/2012 |
| TW | 200917803 A | 4/2009 |

* cited by examiner

*Primary Examiner* — Brandon Miller
(74) *Attorney, Agent, or Firm* — CKC & Partners Co., Ltd.

(57) ABSTRACT

A communication system, a mobile communication apparatus and a switching method of subscriber identification information are disclosed. The switching method includes following steps. First subscriber identification information of a first subscriber identification card is stored into a home location register (HLR) of a mobile telecom network by a first mobile communication device. A request instruction is sent by a second mobile communication device. The request instruction is verified by the mobile telecom network. If the request instruction passes the verification, the first subscriber identification information is duplicated and transmitted to the second mobile communication device.

17 Claims, 3 Drawing Sheets

COMMUNICATION SYSTEM, MOBILE COMMUNICATION APPARATUS AND SWITCHING METHOD OF SUBSCRIBER IDENTIFICATION INFORMATION

RELATED APPLICATIONS

This application claims priority to Taiwanese Patent Application Serial Number 102137343, filed Oct. 16, 2013, which is herein incorporated by reference.

FIELD OF INVENTION

The invention relates to a communication system. More particularly, the invention relates to a system and method for switching subscriber information on mobile communication devices.

BACKGROUND

To fulfill the demanding for information exchanging and instant messaging, mobile communication devices (such as feature phones, smart phones, tablet computers, etc.) become necessary tools for social communication. With the development of mobile telecom network, the mobile communication device connected to the mobile telecom network can be utilized for transmitting/receiving messages, answering/making phone calls, receiving emails or other Internet information and other equivalent applications.

Subscriber identity module (SIM) cards inserted in the mobile communication device are the main reason that the devices are capable to access the mobile telecom network and be recognized as specific user identities. Each SIM card records a specific identification code, which is used to verify the identity of each user on the mobile device.

Every morning, people in the modern society usually leave their home for work in a hurry, and sometimes they may forget to bring their mobile communication devices. If they can not manage to go back and fetch the mobile communication device (e.g., when users go aboard during a long business trip), the users may miss many important phone calls or messages, and even encounter some business losses. Even though the users could borrow or buy another mobile communication device for temporary usage, the users can not fetch the SIM cards within their original mobile communication devices. In other words, the users can not transmit/receive information with their original phone numbers (or as their original identities). In this case, the users are required to set up a call-forwarding from the original numbers to temporary numbers, or notify the relevant persons about the temporary numbers. It is inconvenient to the users when their original SIM cards are inaccessible.

SUMMARY

An aspect of the disclosure is to provide a communication system suitable for a mobile telecom network. The communication system includes a first mobile communication device and a second mobile communication device. The first mobile communication device includes a first subscriber identification card. The first mobile communication device is configured to access the mobile telecom network according to first subscriber identification information within the first subscriber identification card. The mobile telecom network includes a home location register, which corresponds to the first mobile communication device and stores the first subscriber identification information. The second mobile communication device is communicatively connected to the mobile telecom network. The second mobile communication device is operated to send a request instruction to the mobile telecom network. The mobile telecom network verifies the request instruction. Then, the mobile telecom network selectively duplicates the first subscriber identification information stored in the home location register and sends the duplicated first subscriber identification information to the second mobile communication device.

Another aspect of the disclosure is to provide a mobile communication device, which is suitable for a mobile telecom network including a home location register. The home location register stores first subscriber identification information corresponding to another mobile communication device. The mobile communication device includes a subscriber identification card, a wireless communication unit and a control unit. The subscriber identification card is configured for storing second subscriber identification information. The wireless communication unit is configured for accessing the mobile telecom network according to the second subscriber identification information. The control unit operated to send a request instruction to the mobile telecom network for acquiring the first subscriber identification information, such that the wireless communication unit selectively utilizes the first subscriber identification information to access the mobile telecom network.

Another aspect of the disclosure is to provide a switching method for subscriber identification information. The switching method is suitable for a mobile telecom network. The switching method includes following steps. The first subscriber identification information from a first subscriber identification card is stored into a home location register within the mobile telecom network by a first mobile communication device. A request instruction is sent from a second mobile communication device. The request instruction is verified. If the request instruction passes the verification, the first subscriber identification information stored in the home location register is duplicated and transmitted to the second mobile communication device.

Based on aforesaid aspects, the disclosure provides a communication system, a mobile communication device and a switching method for subscriber identification information. The home location register (HLR) within the mobile telecom network stores the subscriber identification information within the subscriber identification card. When users do not have their original subscriber identification card (e.g., the subscriber identification card is forgotten, lost or not around due to other occasional issues), the users can send specific request instructions via new mobile communication devices (e.g., temporarily borrowed phones), such as to request for accessing the original subscriber identification information stored in the home location register. If the request instructions pass the verification, the mobile telecom network transmits the original subscriber identification information to the new mobile communication devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
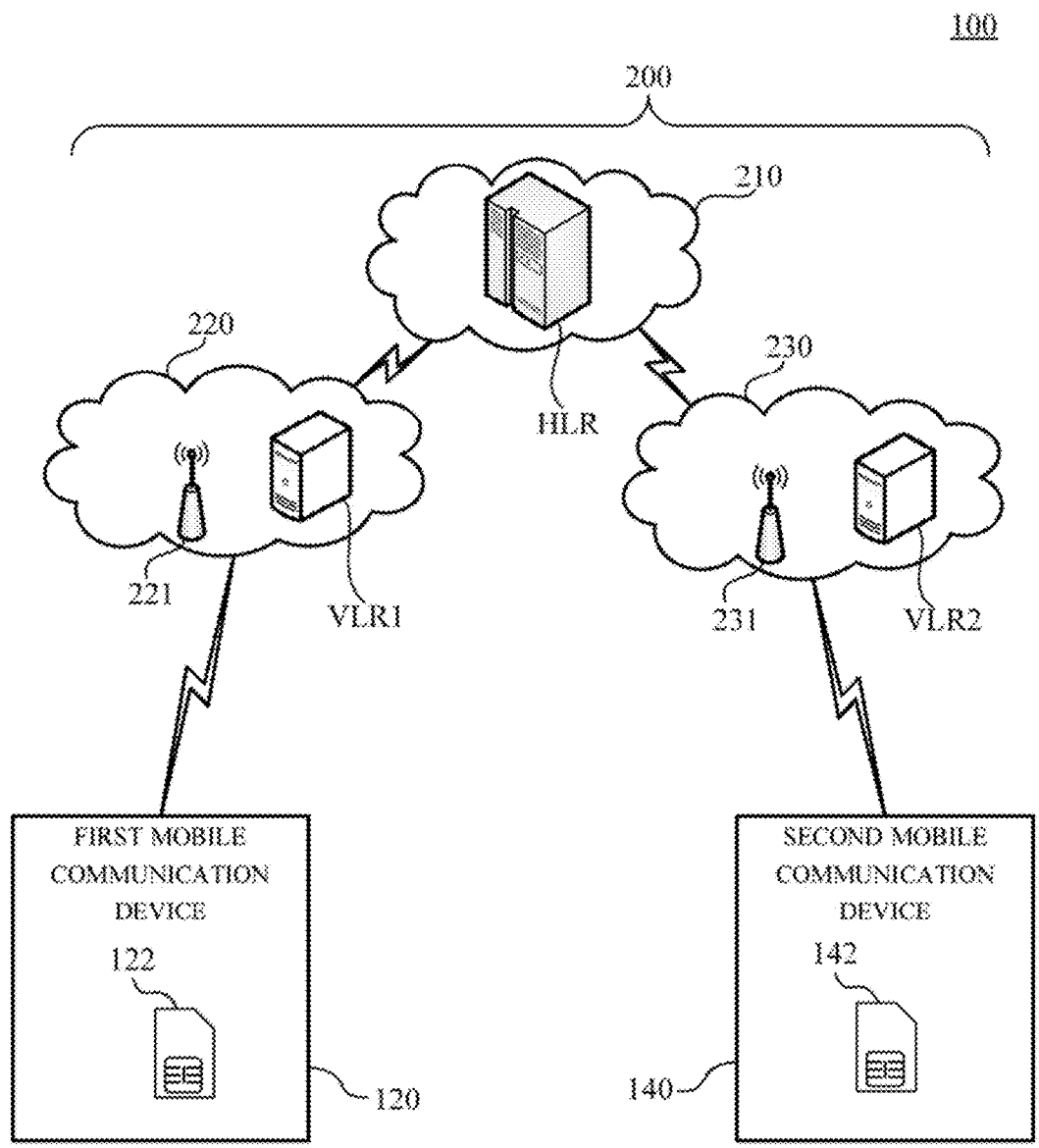
FIG. 1 is a schematic diagram illustrating a communication system according to an embodiment in the disclosure.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Reference is made to FIG. 1, which is a schematic diagram illustrating a communication system 100 according to an embodiment in the disclosure. The communication system 100 is suitable to cooperate with a mobile telecom network 200. The mobile telecom network 200 includes multiple network domains and a server terminal 210. In the embodiment shown in FIG. 1, the mobile telecom network 200 is exemplarily illustrated to include two different network domains 220 and 230 for demonstration. The network domains 220 and 230 can exchange information via the server terminal 210. The server terminal 210 includes a home location register HLR. In the example shown in FIG. 1, each of the network domains 220/230 includes a wireless station 221/231 and a visitor location register VLR1/VLR2 respectively.

The communication system 100 includes a first mobile communication device 120 and a second communication device 140. The first mobile communication device 120 includes a first subscriber identification card 122. The second mobile communication device 140 includes a second subscriber identification card 142.

In some embodiments, the mobile telecom network 200 can be a 2G mobile telecom network (e.g., GSM network), a 3G mobile telecom network (e.g., UMTS network), a 4G mobile telecom network (e.g., LTE network) or any equivalent telecom network. The first subscriber identification card 122 and the second subscriber identification card 142 can be subscriber identity module (SIM) cards, universal subscriber identity module (USIM) cards, removable user identity module (RUIM) cards or any subscriber identification card corresponding to the mobile telecom network 200.

Storage space within each of the first subscriber identification card 122 and the second subscriber identification card 142 stores subscriber identification information of their own respectively. In the embodiment, first subscriber identification information stored in the first subscriber identification card 122 includes an international mobile subscriber identity (IMSI) code, which is unique worldwide. Second subscriber identification information stored in the second subscriber identification card 142 includes another international mobile subscriber identity (IMSI) code, which is also unique worldwide. In other words, the first subscriber identification card 122 and the second subscriber identification card 142 have individual IMSI codes different from each other. The mobile telecom network 200 utilizes the IMSI codes to verify the identity of each user/subscriber.

Telecom companies usually keep aforesaid IMSI codes within the home location register HLR. When the first communication device 120 (or the second communication device 140) is turned on and requests to log in the mobile telecom network 200, the first communication device 120 (or the second communication device 140) utilizes the IMSI code stored in the first subscriber identification card 122 (or the second subscriber identification card 142) to pass a verification procedure executed by the mobile coin network 200 (for example, the server terminal 210 in some embodiments further includes a subscriber verification server, not shown in figures).

In order to protect the IMSI codes from being intercepted (or stolen) during wireless transmission, the visitor location registers VLR1 and LLR2 within the network domains 220 and 230 will replace the IMSI codes into temporary mobile subscriber identity (TMSI) codes, The TMSI codes are temporary data, which are suitable for storing within the first mobile communication device 120, the second mobile communication device 140 and the visitor location registers VLR1 and VLR2.

When a mobile communication device is located under a specific network domain, a corresponding visitor location register of the specific network domain is configured to generate the TMSI code. When the mobile communication device is moved to another network domain, another corresponding visitor location register is configured to generate a new set of TMSI code.

Furthermore, the storage space within each of the first subscriber identification card 122 and the second subscriber identification card 142 in some embodiments further stores user account data, SIM application toolkit (SAT) commands, etc. In addition, the storage space within each of the first subscriber identification card 122 and the second subscriber identification card 142 in some embodiments can be used for storing a contact list.

Each set of the IMSI codes is consisted of a Mobile Country Code (MCC), a Mobile Network Code (MNC) and Mobile Subscriber Identity Number (MSIN). Each IMSI code is usually in a format of 15 decimal digits. The Mobile Country Code occupies 3 decimal digits. The Mobile Network Code (MNC) occupies 2 decimal digits. The Mobile Subscriber Identity Number (MSIN) occupies 10 decimal digits. For example, as a subscriber of Chunghwa Telecom, the Mobile Country Code is 466; the Mobile Network Code is 92; and, the Mobile Subscriber Identity Number is the mobile phone number in common usages (e.g., dialing/messaging).

Figure 2:
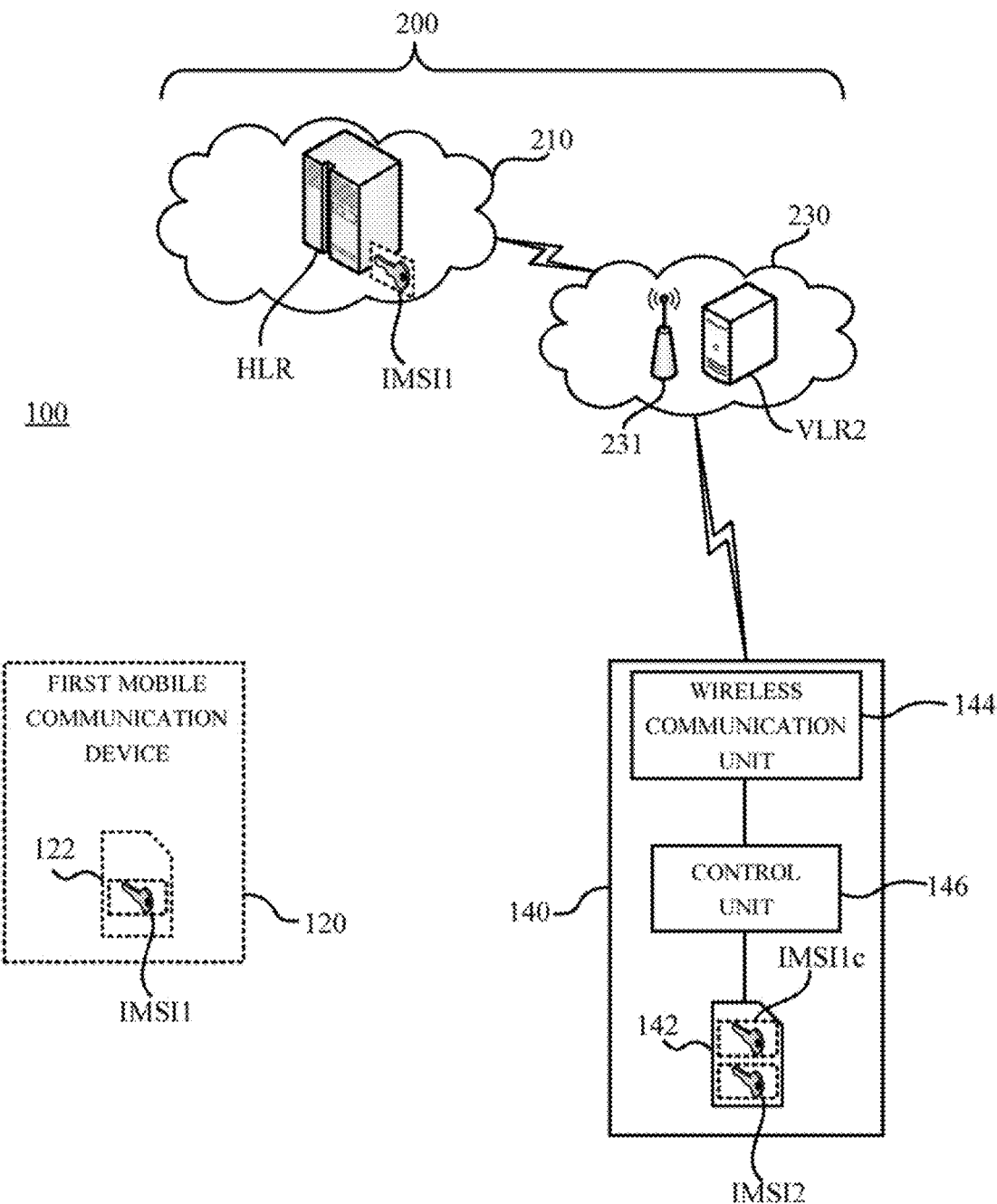
FIG. 2 is a schematic diagram illustrating a situation that the second communication device in FIG. 1 is operated by a user to acquire the first subscriber identification information which is originally stored in the first subscriber identification card of the first communication device.

Reference is also made to FIG. 2, which is a schematic diagram illustrating a situation that the second communication device 140 in FIG. 1 is operated by a user to acquire the first subscriber identification information which is originally stored in the first subscriber identification card 122 of the first communication device 120.

As shown in FIG. 2, the first subscriber identification card 122 has a first international mobile subscriber identity code IMSI1, which is unique. The first international mobile subscriber identity code IMSI1 is principally stored only within the first subscriber identification card 122 and the home location register HLR corresponding to the first mobile communication device 120. The second subscriber identification card 142 also has a second international mobile subscriber identity code IMSI2, which is also unique.

As the embodiment shown in FIG. 2, the second mobile communication device 140 is communicatively connected to the mobile telecom network 200. In a general condition; a wireless communication unit 144 of the second mobile communication device 140 is configured for accessing the mobile telecom network according to the second subscriber identification information (e.g., the second international mobile subscriber identity code IMSI2) within the second subscriber identification card 142, such that the second mobile communication device 140 is communicatively connected to the mobile telecom network 200.

The following paragraphs are related to an assumed condition that the user left his first mobile communication device 120 and the first subscriber identification card 122 at his home. As the embodiment shown in FIG. 2, the user can operate/manipulate an input interface (such as a numeric keypad, functional keys, a touch panel, a voice input or other equivalent input means, not shown in figure) on the second mobile communication device 140, and a control unit 146 of the second mobile communication device 140 is configured to send a request instruction to the mobile telecom network 200 according to the user's operation. In practices, the request instruction can be in a format of Unstructured Supplementary Service Data (USSD) instruction, e.g., sending an USSD instruction as "*527#PHONE_NUM". In the USSD instruction, "527" represents that the user requests to acquire the international mobile subscriber identity code in his original SIM card, and the original phone number of his original SIM card is filled into the column of "PHONE_NUM". In addition, code "527" is only an example here in this embodiment, and the disclosure is not limited to this specific code number.

In some embodiments, the second mobile communication device 140 send the request instruction to the server terminal 210 on the mobile telecom network 200. In order to ensure the security of user information, the server terminal 210 in preferable embodiments requires the user to provide additional data along with the request instruction for identity verification, such as the personal identification number (PIN) or the personal unlock key (PUK) of the first subscriber identification card 122.

The server terminal 210 on the mobile telecom network 200 performs the verification on the request instruction sent from the second mobile communication device 140. If the request instruction passes the verification, it means that the current user on the second mobile communication device 140 is the holder of the first subscriber identification card 122, and the mobile telecom network 200 duplicates and transmits the first subscriber identification information (i.e., the first international mobile subscriber identity code IMSI1) stored in the home location register HLR to the second mobile communication device 140.

In an embodiment, the second mobile communication device 140 stores the duplicated first international mobile subscriber identity code IMSI1$c$ within storage space of the second subscriber identification card 142. In this case, the wireless communication unit 144 of the second mobile communication device 140 is able to access the mobile telecom network 200 according to the duplicated first subscriber identification information (i.e., the duplicated first international mobile subscriber identity code IMSI1$c$). Therefore, the user is able to receive calls, messages, emails and other notifications corresponding to the phone number of the first subscriber identification card 122, and also the user is able to dial, send messages, send emails as the identity corresponding to the first subscriber identification card 122.

In an embodiment, when the first international mobile subscriber identity code IMSI1 is duplicated and sent to the second mobile communication device 140, the second mobile communication device 140 utilizes the duplicated first international mobile subscriber identity code IMSI1$c$ to access the mobile telecom network 200. In other words, the second mobile communication device 140 only receives calls, messages, emails and other notifications from the phone number of the first subscriber identification card 122.

In another embodiment, when the first international mobile subscriber identity code IMSI1 is duplicated and sent to the second mobile communication device 140, the second mobile communication device 140 utilizes both of the duplicated first international mobile subscriber identity code IMSI1$c$ and the second international mobile subscriber identity code IMSI2 to access the mobile telecom network 200. In other words, the second mobile communication device 140 only receives calls, messages, emails and other notifications from both of the phone numbers of the first subscriber identification card 122 and the second subscriber identification card 42.

Furthermore, when the request instruction sent from the second mobile communication device 140 passes the verification on the server terminal 210, the home location register HLR or the first mobile communication device 120 (if the first mobile communication device 120 is turned on and connected to the network) further transmits a contact list, a message record, a call record or an encryption key (e.g., a private key for asymmetric cryptography) along with the duplicated first international mobile subscriber identity code IMSI1$c$ to the second mobile communication device 140. In this case, the second mobile communication device 140 is able to replace the functions of the first mobile communication device 120 easily and completely.

In addition, as the embodiment shown in FIG. 2, even the first mobile communication device 120 is turned off or disconnected from the network, the second mobile communication device 140 is still able to acquire the first international mobile subscriber identity Code IMSI1 from the home location register HLR.

In an embodiment, for security seasons and in order to avoid extra loadings on the mobile telecom network 200, the duplicated first international mobile subscriber identity code IMSI1$c$, which is duplicated from the home location register HLR and stored in the second mobile communication device 140, has a valid time limitation with a certain time period, such as twelve hours, one day, three days, one week or a suitable period negotiated between subscribers and the telecom operators. During the time period within the valid time limitation, the user is able to temporarily use the second mobile communication device 140 to replace the first mobile communication device 120, until the user reaches back to the original first mobile communication device 120 and the first subscriber identification card 122. When the valid time limitation is expired, the duplicated first international mobile subscriber identity code IMSI1$c$ will be deleted from the second mobile communication device 140 automatically. Accordingly, the user personal data will not accidentally exist in a borrowed device for a long time, and it can avoid that there are two terminals with the same IMSI code under the mobile telecom network 200 for a long time.

Figure 3:
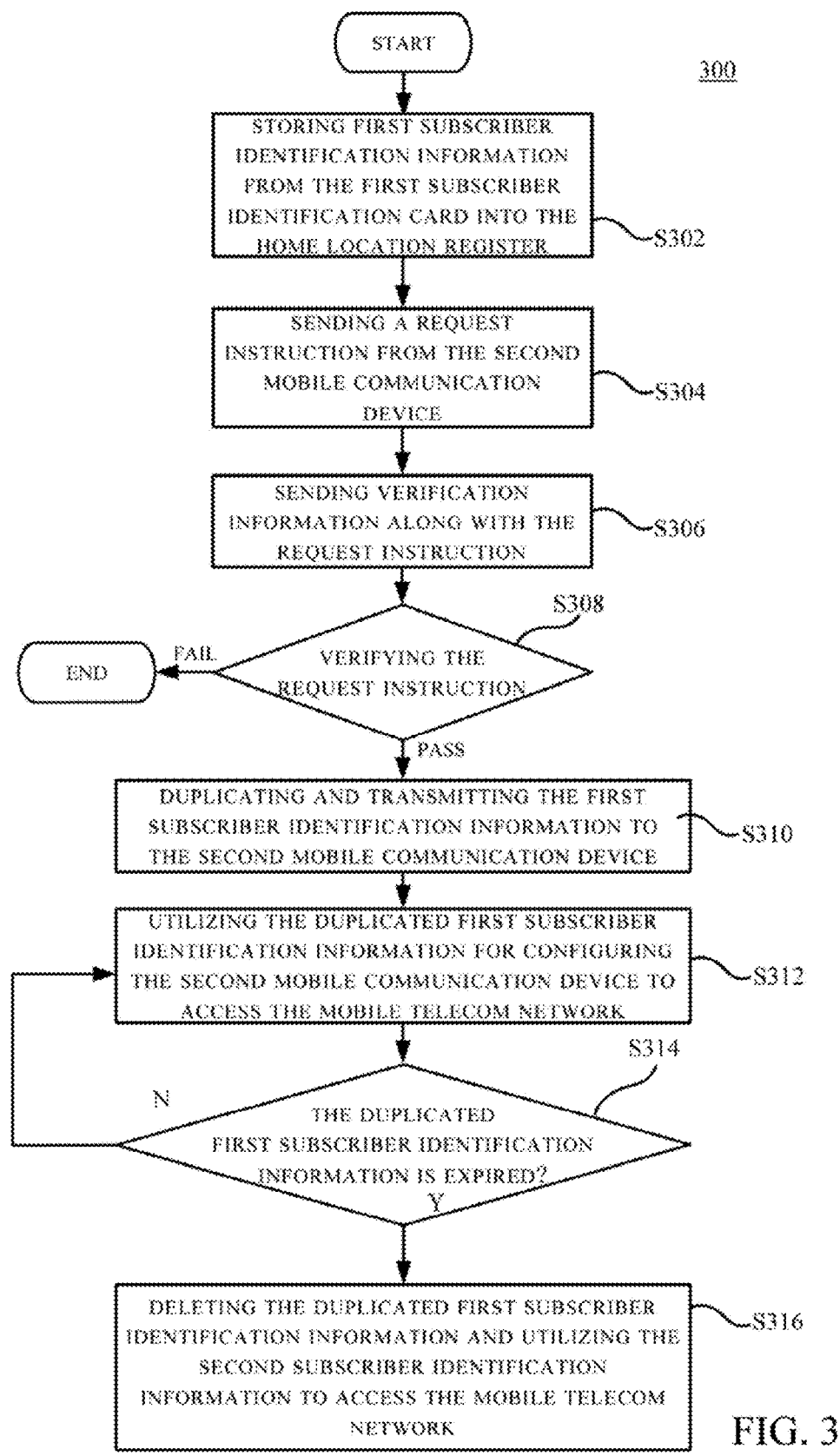
FIG. 3 is a flow-chart diagram illustrating a switching method for subscriber identification information according to an embodiment of the disclosure.

Reference is made to FIG. 3, which is a flow-chart diagram illustrating a switching method 300 for subscriber identification information according to an embodiment of the disclosure. The switching method 300 is suitable to be utilized on the mobile telecom network 200 shown in FIG. 1 and FIG. 2, for switching subscriber identification information (e.g., IMSI codes) on a mobile communication device (e.g., the second mobile communication device 140).

Firstly, the switching method executes step S302 for storing first subscriber identification information (including the first international mobile subscriber identity code IMSI1) by the first mobile communication device 120 from the first subscriber identification card 122 into the home location register HLR within the mobile telecom network 200. It is noticed that step S302 is usually performed at the first time that the first mobile communication device 120 logs onto the mobile telecom network 200. In other words, when the first mobile communication device 120 with the first subscriber identification card 122 perform its first access to the mobile telecom network 200, the first international mobile subscriber identity code IMSI1 of the first subscriber identification card 122 is kept as a record in the home location register HLR of the server terminal 210 within the mobile telecom network 200.

If the user tends to acquire the first subscriber identification information of the first subscriber identification card 122 through the second mobile communication device 140, the user can operate the second mobile communication device 140 to activate the corresponding function. In this case, the switching method 300 executes step S304 for sending a request instruction from the second mobile communication device 140. In some embodiments, the request instruction is sent in a format of Unstructured Supplementary Service Data (USSD) instruction.

Afterward, the switching method 300 executes step S306 for sending verification information along with the request instruction. In an embodiment, contents of the verification information include a phone number and also a Personal Identity Number (PIN) or a Personal Unlock Code (PUC) corresponding to the first subscriber identification information.

Afterward, the switching method 300 executes step S308 for verifying the request instruction. If the request instruction fails to pass the verification, it means the second mobile communication device 140 is not authorized to acquire the first subscriber identification information of the first subscriber identification card 122. If the request instruction passes the verification, the switching method 300 executes step S310 for duplicating and transmitting the first subscriber identification information (including the first international mobile subscriber identity code IMSI1) stored in the home location register HLR to the second mobile communication device 140.

In some embodiments, the switching method 300 further executes step S312 for utilizing the duplicated first subscriber identification information (including the duplicated first international mobile subscriber identity code IMSI1c) for configuring the second mobile communication device 140 to access the mobile telecom network 200. At the time, the second mobile communication device 140 can receive data original transmitted toward the subscriber of the first subscriber identification card 122. In an embodiment, step S312 simply utilizes the duplicated first subscriber identification information for configuring the second mobile communication device 140 to access the mobile telecom network 200. In another embodiment, step S312 utilizes both of the duplicated first subscriber identification information and the second subscriber identification information own by the second mobile communication device 140, for configuring the second mobile communication device 140 to access the mobile telecom network 200.

Furthermore, in an embodiment, the first subscriber identification information duplicated to the second mobile communication device 140 has a valid time limitation. In this case, the switching method 300 further executes step S314 for determining whether the duplicated first subscriber identification information is expired relative to the valid time limitation or not. If the duplicated first subscriber identification information is not expired, it returns to step S312. If the duplicated first subscriber identification information (e.g., the duplicated first international mobile subscriber identity code IMSI1c) is expired relative to the valid time limitation, the switching method 300 further executes step S316 for deleting the duplicated first subscriber identification information and utilizing the second subscriber identification information of the second subscriber identification card 142 for configuring the second mobile communication device 140 to access the mobile telecom network 200.

Based on aforesaid embodiments, the disclosure provides a communication system, a mobile communication device and a switching method for subscriber identification information. The home location register (HLR) within the mobile telecom network stores the subscriber identification information within the subscriber identification card. Users do not have their original subscriber identification card (e.g., the subscriber identification card is forgotten, lost or not around due to other occasional issues), the users can send specific request instructions via new mobile communication devices (e.g., temporarily borrowed phones), such as to request for accessing the original subscriber identification information stored in the home location register. If the request instructions pass the verification, the mobile telecom network transmits the original subscriber identification information to the new mobile communication devices.

It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A communication system, suitable for a mobile telecom network, the communication system comprising:
a first mobile communication device comprising a first subscriber identification card, the first mobile communication device being configured to access the mobile telecom network according to first subscriber identification information within the first subscriber identification card, the mobile telecom network comprising a home location register, which corresponds to the first mobile communication device and stores the first subscriber identification information; and
a second mobile communication device communicatively connected to the mobile telecom network, the second mobile communication device being operated to send a request instruction to the mobile telecom network, the mobile telecom network verifying the request instruction, selectively duplicating the first subscriber identification information stored in the home location register and sending the duplicated first subscriber identification information to the second mobile communication device, wherein, when the request instruction passes the verification, the home location register or the first mobile communication device further transmits a contact list, a message record, a call record or an encryption key to the second mobile communication device.

2. The communication system of claim 1, wherein the second mobile communication device comprises a second subscriber identification card, the second mobile communication device is configured to access the mobile telecom network according to second subscriber identification information within the second subscriber identification card before receiving the first subscriber identification information.

3. The communication system of claim 2, wherein after the second mobile communication device receives the duplicated first subscriber identification information, the second mobile communication device is configured to access the mobile telecom network according to the duplicated first subscriber identification information.

4. The communication system of claim 2, wherein after the second mobile communication device receives the duplicated first subscriber identification information, the second mobile communication device is configured to access the mobile telecom network according to both of the duplicated first subscriber identification information and the second subscriber identification information.

5. The communication system of claim 1, wherein the first subscriber identification information comprises a first international mobile subscriber identity (IMSI) code which is unique, the first IMSI code is principally stored within the first subscriber identification card and the home location register corresponding to the first mobile communication device.

6. The communication system of claim 5, wherein, when the first subscriber identification information is duplicated and sent to the second mobile communication device, the second mobile communication device utilizes a duplicated first IMSI code to access the mobile telecom network.

7. The communication system of claim 6, wherein, the duplicated first IMSI code has a valid time limitation.

8. The communication system of claim 6, wherein, the duplicated first IMSI code is stored within a second subscriber identification card of the second mobile communication device.

9. The communication system of claim 1, wherein the request instruction comprises a phone number and also a Personal Identity Number (PIN) or a Personal Unlock Code (PUC) corresponding to the first subscriber identification card.

10. A mobile communication device, suitable for a mobile telecom network comprising a home location register, the home location register storing first subscriber identification information corresponding to another mobile communication device, the mobile communication device comprising: a subscriber identification card configured for storing second subscriber identification information; a wireless communication unit configured for accessing the mobile telecom network according to the second subscriber identification information; and a control unit operated to send a request instruction to the mobile telecom network for acquiring the first subscriber identification information, such that the wireless communication unit selectively utilizes the first subscriber identification information to access the mobile telecom network, wherein, after the control unit sends the request instruction and the request instruction is verified at the mobile telecom network, the mobile communication device also reads a contact list, a message record, a call record or an encryption key of the another mobile communication device from the home location register or the another mobile communication device.

11. The mobile communication device of claim 10, wherein the request instruction comprises a phone number and also a Personal Identity Number (PIN) or a Personal Unlock Code (PUC) corresponding to the first subscriber identification card.

12. A switching method for subscriber identification information, suitable for a mobile telecom network, the switching method comprising: storing first subscriber identification information from a first subscriber identification card into a home location register within the mobile telecom network by a first mobile communication device; sending a request instruction from a second mobile communication device to the mobile telecom network; verifying the request instruction at the mobile telecom network; if the request instruction passes the verification, duplicating and transmitting the first subscriber identification information stored in the home location register to the second mobile communication device; and if the request instruction passes the verification, transmitting a contact list, a message record, a call records or an encryption key on the first mobile communication device to the second mobile communication device.

13. The switching method of claim 12, wherein, before transmitting the first subscriber identification information to the second mobile communication device, the switching method further comprises:

utilizing second subscriber identification information within a second subscriber identification card of the second mobile communication device for configuring the second mobile communication device to access the mobile telecom network.

14. The switching method of claim 13, wherein, after transmitting the first subscriber identification information to the second mobile communication device, the switching method further comprises:

utilizing the duplicated first subscriber identification information instead for configuring the second mobile communication device to access the mobile telecom network.

15. The switching method of claim 13, wherein, after transmitting the first subscriber identification information to the second mobile communication device, the switching method further comprises:

utilizing both of the duplicated first subscriber identification information and the second subscriber identification information for configuring the second mobile communication device to access the mobile telecom network.

16. The switching method of claim 13, wherein the duplicated first subscriber identification information has a valid time limitation, the switching method further comprises:

if the first subscriber identification information is expired relative to the valid time limitation, utilizing second subscriber identification information for configuring the second mobile communication device to access the mobile telecom network.

17. The switching method of claim 12, wherein the request instruction comprises a phone number and also a Personal Identity Number (PIN) or a Personal Unlock Code (PUC) corresponding to the first subscriber identification card.

* * * * *